Oct. 17, 1939.  L. E. GOFF  2,176,850

PREPARATION OF CELLULOSE DERIVATIVES

Filed June 7, 1937

INVENTOR
LIONEL ELMER GOFF
BY
Edwards Bower Pool
ATTORNEYS

Patented Oct. 17, 1939

2,176,850

UNITED STATES PATENT OFFICE 2,176,850

PREPARATION OF CELLULOSE DERIVATIVES

Lionel Elmer Goff, Alton, Ill., assignor to The Cellulose Research Corporation, East Alton, Ill., a corporation of Delaware Application June 7, 1937, Serial No. 146,743

7 Claims. (Cl. 260—227)

This invention relates to improvements in the manufacture of cellulose esters, particularly cellulose acetate, from cellulose derived from woody material.

An object of the invention is to purify and activate wood cellulose which is normally unreactive to acetylating reagents, or cellulose which when acetylated by conventional processes results in a derivative having high color in acetone or acetic acid solutions, and to convert the cellulose into acetate yielding low color and haze in such solutions. A specific purpose is to obtain these results with wood cellulose which has been dried.

A further object is to provide an economical process for the conversion of purified wood cellulose into cellulose acetate having low color and haze in acetone or other solvent solutions.

An additional object is to provide a process for supplying purified wood cellulose which may be thoroughly dried by known methods, and converting the cellulose into acetate having low color and haze.

In the accompanying drawing which illustrates certain features of the invention.

Many attempts have been made in the past to produce a satisfactory quality of cellulose acetate from wood pulp, since the product of this raw material would be much more economical and comparatively stable in cost in contrast to the fluctuating cost experienced with the use of cotton linters; but at present in the industry cotton linters are the sole source of raw material for manufacturing cellulose acetate.

Owing to the difference in morphological structure, the nature of the impurities present and the general chemical and physical properties of wood cellulose and cotton fibers, the processes for providing a suitable wood base material for conversion into acetate have met with but little success, partly because of the very high color and to a lesser extent the cloudy, high haze of the solutions of such acetates in appropriate solvents. These acetates have also been characterized by a high degree of variability of their properties between successive lots, a condition which is also more or less typical even of acetates derived from cotton linters.

Usually the prior practices for manufacturing acetate entail drastic acid pretreatment with or without catalyst followed by a prolonged acetylation causing degradation, acetolysis and lack of homogeneity.

Figure 1:
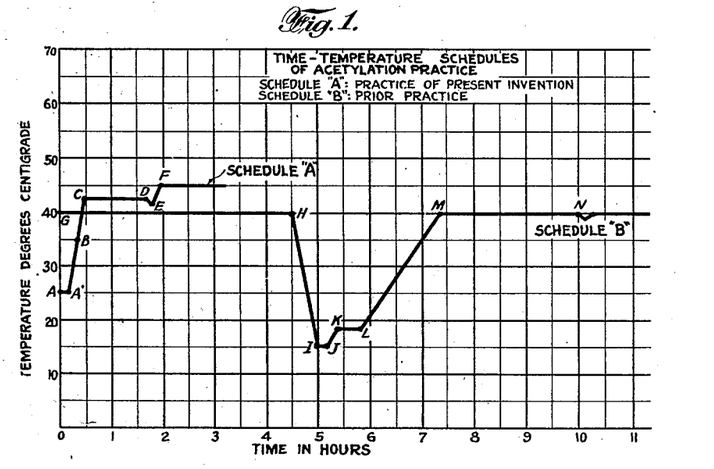
Figure 1 is a chart showing an acetylation schedule typical of the present invention and a comparative schedule typical of prior practices.

Many variations of the prior practice of pretreatment have been proposed, but the resulting cellulose acetate solution has a high color even when the cellulose may be acetylated. For instance, when highly purified, dried wood cellulose having an alpha content in excess of 95% is acetylated by a typical conventional process, such as that illustrated in Figure 1, involving a four-hour pretreatment at 40° C. with acetic acid containing a sulfuric acid catalyst, the resulting acid solution invariably contains high color, usually greater than 200 parts per million and frequently much more; and variations in the time, temperature and pretreating reagents have not eliminated this objectionable feature.

It has been determined that a substantial factor in the persistence of the components causing such high color and/or haze even after the various pretreatments consists in the effects of drying the wood pulp. This result is believed to be due to a change in the noncellulosic constituents, such as the formation of gels which are substantially irreversible, and other changes in the structure and composition of the pulp constituents. In the present invention a method is provided whereby dried wood cellulose pulp may be pretreated and acetylated in such manner as to overcome this difficulty. The invention moreover is particularly advantageous when applied to wood pulp which has been prepared from the wood under carefully regulated conditions before drying.

In general, in the process of the present invention the deficiencies in the prior acetate product from wood cellulose may be overcome by supplying a purified wood cellulosic pulp of high permeability and reactivity, having a purity equal to or exceeding that of the best grades of cotton linters. The pulp is characterized by a remarkable uniformity of the physical and the chemical properties of its individual fibers in each batch, as well as uniformity of similar properties between successive batches.

In the present invention is has also been found that highly purified, dried wood cellulose produced by processes other than that which is disclosed herein, but having certain definable characteristics, can be converted into cellulose acetate entirely satisfactory for commercial use for photographic film, plastics, lacquers and acetate sheeting industries. The wood cellulose used should be of the mercerized type, preferably having greater than 98% alpha cellulose and less than 4% soda solubility. Suitable material may be prepared by mercerizing commercial bleached sulfite or high alpha pulps.

The cellulosic pulp may be converted into acetate by a lenient non-degrading treatment with catalyst followed by a mild acetylation with acetic anhydride in which acetolysis and secondary reactions are avoided, to produce a highly homogeneous acetate distinguished by its exceptional purity and its low color and haze of solutions in appropriate solvents, which are distinguished by remarkable sparkling brilliancy and freedom from opalescent effects. Furthermore, the process results in important reduction in the cost of preparing high quality acetate. Among the important economies are (1) the high yields of purified pulp obtainable from any of the well known pulp wood species, including the abundant southern pines as the base raw material, when the wood cellulose is prepared by the process set forth herein; (2) the elimination of the customary long time conditioning pretreatment of the cellulose prior to acetylation; and (3) the much shortened time of converting the cellulosic pulp to acetate of nearly theoretical yields.

The method of preparing a highly purified wood cellulose which may be dried and thereafter acetylated with the efficiency and advantages indicated, comprises the following correlated sequence of treatments.

Any of the well recognized pulping species of wood, either coniferous or deciduous, may be employed in the process. The supply is selected to exclude defective material and is preferably from trees of a medium, uniform rate of growth. All sapwood is preferred, such as is readily obtainable from the southern pine species under 25 years of growth.

It is desirable to use wood having a moisture content in excess of 30%–40% and to preserve the natural moisture by allowing the bark to remain on the logs until ready for chipping.

In order to secure a uniform digestion, the wood in the form of chips or other suitable subdivisions should be first thoroughly impregnated with the digesting liquor. This may be accomplished, for example, in the following manner. The wood subdivisions may be submerged and boiled in water, for example, in a digester, under freely vented conditions until substantially all of the air has been removed. The digester is then closed and steam introduced above the water level to force the free excess water from the chips and the digester through a suitable vent below the chip level. Steaming is continued until the water content of the chips has been reduced to the order of 100% by weight, based on the dry weight of the wood. The digester is then closed and sealed and a sulfite treating liquor is pumped into the digester until a ratio of liquor to oven dry wood of, for example, the order of 6:1 is attained. A partial vacuum is created within each wood subdivision by condensation of the steam within the wood by contact of the hot chips with liquor at lower temperature, which draws the inflowing liquor into all the capillaries and interstices. This results in complete saturation of the chips with the treating liquor before active delignification can occur. The treating liquor may be introduced at a temperature somewhat in excess of 100° C. and the desired complete saturation attained by condensing the steam within each wood subdivision by increasing the pressure in the digester.

The uniform saturation of the chips prior to active temperatures permits a mild and uniform digestion in shorter time of the wood without substantial degradation to any given bleachability. It also permits higher cuprammonium viscosities than have heretofore been attained in pulping practices.

After the wood subdivisions have been thoroughly impregnated with the digesting liquor they are then uniformly digested. This may be accomplished as follows: The mass of impregnated chips and liquor is heated as rapidly as facilities will permit to the order of 120°–130° C. and held at this temperature, preferably without gas relief, to effect sulfonation. This may be accomplished in from 2–3 hours, after which the temperature is raised to the order of 130°–135° C. and maintained at the elevated temperature from 2–4 hours to effect the hydrolysis of the non-cellulosic material. The bleachability and viscosity of the pulp may be satisfactorily controlled by proper adjustment of the time and/or temperature of the hydrolysis period.

After thorough washing the digested pulp is defibered by any suitable mechanical means to effect a maximum exposed surface area of ligneous and other noncellulosic material. Any neps or bundles remaining in the pulp are removed by screening.

In order to remove the ligneous material from the defibered pulp it is subjected to a uniform chlorination and alkaline treatment. For example, the defibered pulp is treated with an amount of chlorine gas expressed in pounds per 100 pounds of oven dry pulp, calculated as 14%–18% of the bleach value of the digested pulp. The gas is added to a water slurry of the pulp during vigorous agitation in as short time as possible consistent with uniform distribution of the gas throughout the slurry. The chlorine will be exhausted in about 10 minutes or less, but the treatment is continued with agitation for a sufficient time to permit the removal of mineral matter soluble in the hydrochloric acid formed during the reaction.

The chlorinated compounds are removed by a dilute alkaline treatment, preferably at atmospheric boiling temperature. This may be accomplished by adding a sufficient amount of sodium hydroxide solution to the pulp slurry to effect a concentration of the order of 1%. Boiling would then be continued for approximately 30 minutes with continuous agitation. The alkaline solution is drained and the pulp thoroughly washed with water, preferably until neutral. The effect of the controlled chlorination and alkaline treatments is to reduce the bleach value of the pulp to the order of 1.5%, irrespective of the bleachability of the raw pulp within the range of 5%–50%.

Variations in the concentration, consistency and temperature in carrying out the alkaline treatment may be employed to advantage and, provided these conditions remain fixed between successive batches the pulp will be brought to an almost invariable, fixed bleach value within the range of 1%–5%.

The pulp is next bleached in a hypochlorite solution to improve its color and control the viscosity of the cellulose. A hypochlorite solution containing from 1%–6% bleaching powder (based on the pulp) is preferably used. An example of other conditions which may be used to accomplish this purpose satisfactorily is as follows: The pH of the solution is brought to not less than the order of 8.0 by the addition of alkali; for instance, milk of lime. The treatment is preferably carried out for from 3–4 hours at a temperature which may vary from the order of 25°–35° C., depending upon the extent of the reduction of viscosity of the pulp it is desired to attain. The cuprammonium viscosity is rapidly reduced in the first hour of the treatment, but thereafter the rate of reduction is relatively small. By continuing the hypochlorite treatment until comparatively little change in the viscosity is reached, the treatment may be readily terminated at the desired viscosity level. Since the rate of viscosity reduction is effected by the temperature, concentration and consistency of the solution employed, the viscosity of the treated pulp may be brought to a nearly invariable value between successive batches by proper control of these factors.

The residual oxidizable impurities in the pulp are reacted upon during the early stage of the bleach treatment. Upon the completion of the bleaching the pulp is thoroughly washed with water until free of available chlorine, preferably until neutral.

In order to remove soda soluble material and make the cellulose more permeable, the bleached fiber is next treated with a hot alkaline solution. In the preferred method the bleached pulp is boiled at atmospheric pressure in a sodium hydroxide solution of from 5% to 10% concentration, preferably of the order of 7% and with atmospheric oxygen excluded, for from 1–3 hours during continuous agitation. The effect of the treatment is to reduce the soda solubility of the pulp to less than 4% with a corresponding increase in the alpha cellulose content. After the treatment the pulp is washed until substantially free of the treating liquor.

While not ordinarily necessary, if an exceptionally high white color and/or further adjustment of viscosity of the pulp is desired, it is given a second mild hypochlorite treatment controlled as described in the first hypochlorite treatment. The pulp is thereafter washed, preferably until neutral.

The bleached fiber is then given a treatment which changes its physical and chemical state to resemble that of mercerized cellulose; that is, the material is purified by a removal of lower polymers of the cellulose and noncellulosic constituents, and at the same time is opened up so that there is greater space between the micellar units of the fiber. This may be satisfactorily accomplished, for example, by treating the bleached fiber with a solution of caustic soda of mercerizing concentration at ordinary temperatures. Only a short time of such alkali treatment is necessary for this, providing all of the fibers are uniformly treated, a period of ½ to 1 hour at about 25°–30° C. being generally adequate. Upon the completion of the treatment, the caustic solution is drained or pressed from the mass and the pulp washed with water until neutral in as short time as possible, preferably less than 15 minutes, under conditions controlled to avoid any adverse effect on the chemical and physical properties of the mercerized pulp.

All of the above described processing steps are carried out in such a manner as to remove the noncellulosic material from the fibers uniformly and progressively, so that the fibers comprising the mercerized pulp consist of a skeletal cell wall structure in which the capillaries and interstices have been uniformly cleared of the obstructive impurities. As these materials are progressively removed, the skeletal structure becomes more and more porous due to increased swelling. Finally an optimum, swollen condition is imparted to the fibers by the mercerizing treatment. An important effect of the controlled series of treatments is to impart an exceptional and invariable high reactivity to the cellulosic material such that subsequent acetylation may be effected under conditions which almost completely avoid any form of degradation and insure a uniformity of product between successive batches.

In the various purification steps the pH of the pulp is brought within closely controlled limits between successive batches after each reaction has been completed. This control is especially important upon the termination of the mercerizing treatment. The mercerized pulp is extremely sensitive to any acidic or alkaline condition and if the pulp is to be stored for any extended period, undesirable chemical changes may take place unless the pH of the pulp has been adjusted to about 7.0.

The process thus generally indicated will produce a purified pulp which may be acetylated in the manner hereinafter indicated. When pulps produced in other ways are selected, they should be of the mercerization type, preferably having greater than 98% alpha cellulose and less than 4% soda solubility. A suitable material may be prepared by mercerizing commercial bleached sulfite or high alpha pulps.

At this point the mercerized cellulose may be dried by evaporative means for convenience in shipping, or the water content may be removed by displacement with acetic acid.

In either case, in order to overcome any adverse effects of drying on the reactivity of the cellulose and in order to remove with substantial completeness any residual traces of coloring material retained by the cellulose, it is subjected to an extraction treatment with hot acetic acid. For instance, the cellulose is treated by passing acetic acid at elevated temperature, preferably between 50°–100° C., through the cellulose until the soluble coloring material has been removed. This may be accomplished by treating the cellulose in a bath of acetic acid at such elevated temperature and thereafter displacing the treating acid with fresh acid, or by passing hot acid through the cellulose until the coloring material has been removed. In either case, the pulp will be saturated with pure acetic acid. The treatment may be carried out in any of the well known types of extraction apparatus or it may be accomplished by means of the dehydration equipment described and claimed in copending application, S. N. 70,372. In the latter case the temperature of the displacing piston of acetic acid is controlled to above 50° C. by means of a suitable jacket with which the dehydrator is equipped.

It is desirable however to carry out the process so that a part or all of the moisture in the cellulose is removed, since about 5 parts of anhydride to each part of residual water in the cellulose are wasted in reacting to form acetic acid. This is of great economical importance as the cost of anhydride at present is a major cost factor in the production of cellulose acetate.

The effect of the treatment is to activate the cellulose and remove colored impurities, whether they be fatty material, insoluble soaps, waxes, resins, mineral constituents, decomposition products of pentosans or other matter, and to remove residual moisture from air or thermally dried cellulose. It has been found that these impurities are not soluble in cold acetic acid and further, that they are much less responsive to the hot acetic acid treatment after the pulp has been treated with a catalyst of sulfuric acid. It is important therefore that the acetic acid extraction be carried out prior to the addition of the catalyst.

After the extraction any excess acid may be removed from the cellulose by any convenient means, such as pressing or centrifuging. The pretreating acid may be used repeatedly for extraction purposes, usually until the moisture content becomes uneconomically high.

Another method for carrying out the purification consists in treating the cellulose within a time-temperature range between approximately 90 minutes at 50° C. and about 30 minutes at 90° C. Carrying out the treatment at temperatures appreciably below 50° C. results in less satisfactory solution of the coloring material and activation of the cellulose. After pretreatment the acid may be removed by washing with an excess of fresh acetic acid. It is preferred to have the cellulose in the form of a cake in suitable pressure apparatus such as is shown diagrammatically in Figure 2, and to remove the pretreating acid by forcing a liquid piston of fresh acid through the cake of cellulose by means of air pressure or vacuum.

At this point the cellulose may be acetylated, desirably as described below, or it may be washed free of acid with water and dried to 2%–4% moisture content by the usual well-controlled thermal methods for convenience in shipping. If the cellulose is dried at this point, it may likewise be acetylated by first pretreating with acetic acid, for instance, for 3 hours at 60° C. and then treated with catalyst and acetic anhydride as described below.

After the activation of the cellulose and the removal of coloring material it is highly important that the subsequent acetylation be carried out in such a manner that no coloring matter is introduced, for instance, by acetolysis or in the form of cellulosic decomposition products. Such degradation materials and products of acetolysis result in an inferior, non-uniform acetate, usually of high color and inferior strength properties.

A sulfuric acid catalyst preferably less than 3% by weight based on the oven dry weight of the cellulose, is first mixed with glacial acetic acid and the mixture uniformly added and distributed throughout the mass of acetic acid saturated cellulose in as short a time as possible, and with a substantially uniform interval between successive batches. Due to the condition of the cellulose a very economical use of acetic acid in the acetylating mixture is possible if desired by adding only an amount with the catalyst such that the ratio of total acid to oven dry cellulose is of the order of 4:1 or less. The treatment is preferably carried out at a temperature of the order of 25° C. for not more than 30 minutes after all of the catalyst has been added to the cellulose. One effect of the treatment is to reduce the cuprammonium viscosity of the cellulose to the order of 6 centipoises, irrespective of its initial viscosity. The treatment almost completely avoids degradation of the cellulose as evidenced by the fact that only a very small reduction in the alpha content occurs.

As soon as the catalyst has been uniformly incorporated into the cellulose, at which point the cuprammonium viscosity of the cellulose has generally been reduced to the order of 6 centipoises, about 2.2 or less parts of 100% acetic anhydride to each part of oven dry cellulose are promptly added to the mass during continuous agitation. The temperature of the cellulose at the start of the acetylation should preferably be low enough to facilitate its control during the addition of the anhydride. It has been found satisfactory to adjust the temperature of the mass to about 25° C. The acetic anhydride should be added in such a manner that no rapid increase in temperature occurs. This may be accomplished by adding it uniformly at such a rate that the temperature of the mass desirably increases in a nearly straight line to about 42.5° C. when all of the reagent has been added. This usually requires from 60–80 minutes and the temperature is thereafter held at about the same level until clear, grain free triacetate is formed.

When the mass has been converted to grain free triacetate, the reaction is terminated. This is conveniently done by the addition of 2.2 parts of 50% acetic acid containing about 0.06 part of concentrated sulfuric acid, based on the oven dry weight of the pulp. The triacetate will normally contain less than 50 p. p. m. color and haze. The yield is usually in excess of 165% by weight, based on the oven dry weight of the cellulose.

In order to obtain acetone soluble material it is necessary to subject the cellulose triacetate to a hydrolysis treatment. This may be accomplished by controlling the temperature of the mass at the order of 42.5° C., during continuous, slow agitation for a sufficient time to effect the desired combined acetic acid content of the acetate. For example, an acetone soluble product having a combined acetic acid content of the order of 54% will require about 18 hours.

When the desired combined acetic acid content has been attained, the hydrolysis is terminated. This may be done by slowly adding about 0.2 part of sodium acetate dissolved in a small quantity of 50% acetic acid to the mass during constant agitation. The purity of the cellulose acetate may be gradually improved, if desired, by subjecting the acid solution to a single stage filtration and then precipitating it by slowly allowing it to flow into water or dilute acetic acid during constant agitation.

If desired, the precipitated acetate may be further purified and stabilized by washing with cold water until free of acetic acid and then treated in hot water at about 90° C. for somewhat less than 1 hour, dewatered and dried at a temperature preferably between 65°–75° C. The yield of acetone soluble acetate having a combined acetic acid content of the order of 54% will be in excess of 1.5 parts by weight to each part of oven dry cellulose employed.

All of the treatments to which the wood is subjected are controlled to avoid degradation of the cellulose. This results in cellulosic pulps having cuprammonium viscosities not only much higher than have heretofore been found in wood celluloses, but which are well within the range of the best qualities of purified linters. Thus, a cellulosic pulp is provided by the present invention of an entirely new state of molecular organization, since it has heretofore been generally accepted that wood cellulose exists in a much lower state of molecular complexity than cotton. The process, furthermore, provides a ready means for reducing the cuprammonium viscosity of the purified cellulosic pulp to any value demanded by the derivative process in which it is to be employed.

The viscosity of the pulp is regulated initially by control of the time, temperature, amount and concentration of reagents employed in the digestion of the wood. High raw pulp viscosities in excess of 50 centipoises result from relatively low temperatures and extended time of treatment during hydrolysis, while pulps of viscosities below 50 centipoises are obtained by higher temperature and/or shorter time of hydrolysis. The viscosity of the chlorinated pulp is reduced in the hypochlorite bleach treatment at or slightly above the level desired in the final purified product. By a combination of the digestion and hypochlorite bleach viscosity controls, a highly purified cellulosic pulp is readily attained having a cuprammonium viscosity well in excess of 30 centipoises. Where a relatively low cuprammonium viscosity in the purified pulp is desired, the viscosity of the raw pulp is controlled in the digestion process to a value below 50 centipoises such that the further reduction required by the hypochlorite treatment will preferably not exceed 10 or 15 centipoises. By properly correlating the controls of the two treatments, any desired viscosity in the purified cellulosic pulp may be obtained without entailing any substantial degradation of the cellulose. The purification treatments subsequent to the hypochlorite bleach are controlled so as to effect only minor changes in the viscosity provided by the hypochlorite bleach treatment. These subsequent changes moreover are practically invariable from batch to batch, so that the viscosity of the purified cellulosic pulp may be duplicated within 5% or less between successive batches.

The solution viscosity of the acetate is controlled to any desired value by correlating (1) the cuprammonium viscosity of the purified pulp; (2) the water content of the dried cellulose; (3) the viscosity of the cellulose after pretreatment with sulfuric acid catalyst; (4) the amount and concentration of reagents employed in the acetylation of the pulp to triacetate; and (5) the hydrolysis of the triacetate. For the accurate duplication of any given viscosity of the acetone solutions of acetate between successive batches, it has been found especially desirable to employ cellulose having nearly invariable cuprammonium viscosities between successive lots and to dry or dehydrate the cellulose to a nearly invariable water content. The process of the present invention insures the duplication of these properties within far smaller limits than have heretofore been found possible.

For the best results it is desirable to use only reagents of the highest quality. This applies especially to the processing water and particularly to the water used throughout the washing of the cellulose when it has reached a high degree of purity and to the water during the entire acetylation cycle.

Care should be exercised throughout the process, particularly during the purification and acetylation cycles, to exclude dirt, dust and other contaminates and to maintain the apparatus scrupulously clean.

The pulping of the wood chips is carried out in such a manner that the reagents employed are first uniformly incorporated with the material to be reacted upon under conditions which permit little, if any, reaction to occur. Only after the reagents have been uniformly distributed throughout the wood subdivisions are the necessary reactive conditions supplied. In each of the steps following the pulping of the wood, comprising purification of the cellulose and its conversion into acetate, the treating conditions are so controlled that each particle of cellulose is subjected to the same conditions of reaction with respect to the time, temperature and concentration of reagents employed. The importance of these provisions lies in the fact that they insure such uniformity of reaction throughout the processing cycle as to yield an acetate product of heretofore unattainable homogeneity, uniformity and viscosity. The properties of the acetate, furthermore, are of enhanced value since they reflect the overall effect of avoiding undesirable chemical degradation throughout the process.

The acetone solutions of the acetate have a color of less than 50 p. p. m. and frequently as low as 25 p. p. m. or less. The acetate is further distinguished by its stability, high charring and melting points and particularly by its nearly invariable properties between successive batches. A characteristic property of sheets made from the aceatate is their remarkable homogeneity and toughness.

In order to describe more particularly the present invention and the manner of attaining uniformity in the reactions and of the properties of the acetate product distinguished by the low color and haze of its acetone solutions, the following examples set forth typical embodiments thereof.

*Example A*

Any of the well known species of coniferous or deciduous woods are satisfactory base raw material. Likewise, any of the usual acid delignifying solutions such as calcium or ammonium bisulfite may be employed.

In the present example black gum chips selected for freedom from defective material and preferably having a normal moisture content greater than 30% are charged into a digester. Water is added in sufficient quantity to completely immerse the chips and the mass raised to the boiling point by steam admitted into the digester below the chip level. The mass of water and chips is boiled for about 30 minutes under freely vented conditions, care being taken to maintain the chips completely immersed during the treatment. The boiling eliminates all of the air from the chips and partially impregnates them with water. Upon the completion of the boiling, the water is drained by admitting steam through the top of the digester and opening a suitable outlet in the bottom to permit the discharge of the water. After all of the water is thus forced from the digester, the bottom outlet is closed and steaming is continued until the water content of the chips has been reduced to the order of about 100% by weight of the dry weight of the wood. This leaves the digester, the voids around the chips and the capillaries and interstices within the chips completely filled with steam at approximately 100° C.

Ammonium bisulfite solution of normal strength, for example, total $SO_2$ content of 6.0% and combined $SO_2$ of 1.1%, preferably at elevated temperature of the order of 90° C. is then introduced in sufficient quantity to completely immerse the chips. A ratio of liquor to oven dry wood of the order of 6:1 is sufficient for this purpose. When the liquor comes in contact with the chips the steam with which they are saturated is condensed, thereby creating a partial vacuum which acts to draw the cooking liquor into all the capillaries and interstices of the chips.

In about 15 minutes or less the chips become completely saturated with the treating liquor. Since very little reaction, if any, between the treating liquor and woody material occurs under 100° C. uniform and complete distribution of reagent with all parts of the noncellulosic material in the wood is thus effected prior to active digestion conditions. This relationship of treating liquor and chips permits initiation of the delignifying reaction simultaneously throughout every portion of each chip upon the application of reactive temperatures. Thus, the innermost inaccessible portions of each chip are reacted upon in substantially the same time as the outer exposed portions.

Steam is now admitted into the digester to raise the temperature of the mass to the order of 120°–124° C., where it is held for approximately 3 hours to permit the sulfonation of the noncellulosic components of the wood. Gas reliefs are preferably not practiced during the sulfonation of the wood and are unnecessary since the pressure in the digster, due to the complete elimination of air, will not exceed 85 pounds per square inch. By avoiding the loss of sulfur dioxide gas which is caused by venting during sulfonation, the treatment of the woody material with a liquor of nearly invariable composition between successive batches is insured.

At the end of the sulfonation, the temperature is raised to the order of 135° C. at a uniform rate in about 1 hour and maintained at this level for from 2–4 hours, depending upon the bleachability and viscosity desired in the digested pulp. To obtain the highest viscosities in the digested pulp, the treatment following the sulfonation should be carried out at somewhat under 135° C. until a readily defiberable pulp has been produced and prolonging the time to about 4 hours. The pulp resulting from this schedule will have a relatively high bleachability as well as a high viscosity, for example, in excess of 25% combined with a viscosity in excess of 40 centipoises. If a bleachability less than 25% combined with a relatively high viscosity is desired, the delignification time may be prolonged beyond 4 hours. A pulp with a bleachability of less than 25% and a viscosity under 40 centipoises may be obtained by increasing the temperature during delignification to 140° C. or higher and adjusting the time of treatment to produce a readily defiberable pulp.

Gas relief to control the pressure in the digester below the permissible limit of the equipment is carried out during the delignification period by a series of short ventings of less than 30 seconds each, which will accomplish the desired reduction in pressure without substantially lowering the temperature of the mass. In final stages of the digestion more extended gas relief is made to effect recovery of sulfur dioxide for re-use.

Upon the completion of the digestion schedule the pulp is blown from the digester in the customary manner, washed with water preferably at elevated temperature until it is neutral to litmus. The washed pulp is screened to remove heavy foreign material and defibered by any suitable mechanical means until substantially all of the fiber bundles or mats of fibers have been separated. Any remaining fiber bundles or neps are removed from the pulp by additional screening. Thus, a maximum exposed surface area and consequently accessibility of ligneous material is provided for the next step in the refining of the pulp.

By the foregoing digestion schedule from 50–52 pounds or more of oven dry pulp are obtained from each 100 pounds of oven dry black gum chips used. A typical sample of the pulp has the following analysis:

| | |
|---|---|
| Alpha cellulose | 87.9% |
| Soda solubility | 24.6% |
| Cuprammonium viscosity (ctps.) | 41.1 |
| Bleachability | 22.7% |
| Pentosans | 6.8% |
| Ash | 0.76% |

The washed, screened pulp is transferred to a gas tight chlorination tank equipped with high efficiency agitation and its consistency adjusted to the order of 3%. A quantity of chlorine expressed in pounds equal to 16% of the bleach value of the raw pulp is incorporated in the pulp slurry at a uniform rate of flow in less than 30 minutes. The gas is added as rapidly as possible consistent with uniform distribution throughout the pulp and will be exhausted in from 5–10 minutes after the total quantity has been added. The treatment is continued after exhaustion for about 45 minutes to permit the hydrochloric acid formed in the treatment to react with the ash constituents of the pulp.

Upon the completion of the chlorination a sufficient amount of sodium hydroxide is added to the slurry to effect an equilibrium concentration of the solution of the order of 1%. The treatment consistency is preferably as high as the available agitation equipment will permit and at the same time insure uniform mixing. The pulp slurry is brought to the order of 100° C. and held at that temperature for about 30 minutes. It is then drained and the pulp is thoroughly washed with water, preferably until neutral.

The effect of the alkaline treatment following the chlorination is to remove substantially all of the ligneous material present in the pulp and to reduce the bleachability to the order of 1.5%. This result is attained irrespective of any variations which may exist in the bleachability of the raw pulp between successve lots. A typical analysis of the pulp at this stage is:

| | |
|---|---|
| Alpha cellulose | 94.9% |
| Soda solubility | 6.5% |
| Cuprammonium viscosity (ctps.) | 54.1 |
| Bleachability | 1.1% |
| Pentosans | 5.4% |
| Ash | 0.5% |

The washed pulp is transferred to a bleaching tank and treated at a consistency of the order of 2.5%–3% with a hypochlorite solution containing 60–70 grams of bleaching powder per liter saturated with lime. 2.5 pounds of bleaching powder (calculated on the basis of 35% available chlorine) for each 100 pounds of pulp is used which will give a concentration of bleaching powder of 0.067%. The reaction is allowed to proceed for 4 hours at a temperature of 25° C. which reduces the viscosity to approximately 35 centipoises. By increasing the temperature of the treatment a greater reduction of viscosity may be effected; likewise, by increasing the time of bleaching at any given temperature a greater reduction of viscosity will occur. Since the rate of reduction of the cuprammonium viscosity of the pulp is quite rapid during the first hour of treatment and thereafter tends to level out, a very accurate control of the viscosity of the pulp to any desired value can be effected by the proper correlation of the time and temperature of treatment. The bleaching step provides a very convenient and accurate means of adjusting the pulp viscosity to any desired level in the end purified pulp because the subsequent purification treatments are controlled to cause only very minor changes in this value. A typical sample of the pulp at the termination of the bleaching will have the following analysis:

| | |
|---|---|
| Alpha cellulose | 94.5% |
| Soda solubility | 6.6% |
| Cuprammonium viscosity (ctps.) | 35.0 |
| Bleachability | 0.4% |
| Pentosans | 5.2% |
| Ash | 0.4% |

At the completion of the bleaching, the solution is drained and the pulp washed, preferably until neutral, dewatered until its consistency is of the order of at least 25%. The pulp cake is then added to a solution of caustic soda of such strength that when mixed with the water held by the pulp the initial equilibrium concentration of reagent will be of the order of 7%. The temperature of the caustic solution to which the pulp cake is added is preferably at least 50° C. and may vary up to boiling temperature. The treatment consistency may vary between the order of 4%–12%, depending upon the type and efficiency of the agitation equipment available. The treatment is carried out at atmospheric boiling temperature with continuous agitation for ½–3 hours under conditions which permit only a minimum amount of oxygen to come in contact with the pulp. Upon the termination of the boiling the pulp is drained free of excess solution and washed with water, preferably until neutral. A typical sample will have the following analysis:

| | |
|---|---|
| Alpha cellulose | 96.6 % |
| Soda solubility | 3.1 % |
| Cuprammonium viscosity (ctps.) | 34.0 |
| Bleachability | 0.3 % |
| Pentosans | 2.8 % |
| Ash | 0.35% |

The treated pulp is slightly discolored by the alkaline treatment and if a very high white product is desired, it is now given a second hypochlorite bleach of from 0.5%–1.0% calcium hypochlorite, carried out under substantially the same treating conditions as described. It is then thoroughly washed and dewatered until its consistency is of at least the order of 25%.

The pulp cake is now added to a mercerizing caustic soda solution of such strength that after being diluted by the water held by the pulp, the initial equilibrium concentration will be in the range of from 12% to 15%. The treatment is carried out at a temperature between the order of 25°–35° C. for from ½–4 hours. Maximum removal of impurities and maximum swelling and reactivity of the fibers are effected under these conditions without appreciably changing the cuprammonium viscosity of the pulp. Temperatures much in excess of 30° C. are to be avoided since they entail an appreciable lowering of the viscosity as well as an increase in the color of the acetone solutions of the acetate prepared from the mercerized cellulosic pulp.

The properties of the cellulose are extremely sensitive to the procedure followed in removing alkali upon the completion of the mercerizing treatment. It is desirable, therefore, that the equipment used for washing the alkali from the cellulose be designed to effect the removal in the shortest possible time with a minimum exposure of the cellulose to air. By removing the alkali in very short time, a condition of very high reactivity and other favorable properties are imparted to the cellulose such as are nearly ideal for subsequent reaction with the acetylating reagents. It is important that the mercerized pulp be washed until neutral, since any acidic or alkaline condition tends to cause undesirable chemical changes, especially if the material is stored for any great length of time before it is converted into the derivative.

A typical sample of the mercerized pulp has the following analysis:

| | |
|---|---|
| Alpha cellulose | 99.2% |
| Soda solubility | 2.3% |
| Cuprammonium viscosity (ctps.) | 30.0 |
| Bleachability | 0.25% |
| Pentosans | 2.5% |
| Ash | 0.06% |

The yield of the mercerized pulp resulting from the foregoing processing is from 34–36 pounds or more from each 100 pounds of the original oven dry black gum wood. In general, the yield from coniferous woods is somewhat higher than from deciduous woods; slash pine, for example, giving from 36–38 pounds or more from each 100 pounds of oven dry wood.

The pulp may be dried, if desired, by any of the well known evaporative methods for economy and convenience in storing or transportation; or, it may be directly treated without drying by the next step in the process. The mercerized pulp usually contains very small residual quantities which may be mere traces of impurities which have been found to be responsible in part for the characteristic high color of the solvent solutions of acetate derived therefrom. By the correlated sequence of treatments of this invention just described these residual coloring impurities are eliminated to a far greater extent than by any of the prior practices. Nevertheless, they frequently impart a color to the acetic acid or acetone solutions of the acetate which is somewhat higher than is desirable for the best qualities of photographic film, sheeting, colorless lacquers and similar products. This is especially true if the mercerized cellulose is dried by evaporative methods and thereafter acetylated by the process described and claimed in copending application of Lyle Sheldon et al., filed February 18, 1937; S. N. 126,362. By removing substantially all of this residual coloring material by the next step of the present process, the solutions of the acetate in suitable solvents are characterized by a sparkling brilliancy and extremely low color and haze.

The mercerized, dried cellulose is next treated with acetic acid at elevated temperature to effect a further removal of residual coloring material mentioned and to further activate it. A satisfactory type of apparatus for effecting the extraction is illustrated diagrammatically in Figure 2.

Figure 2:
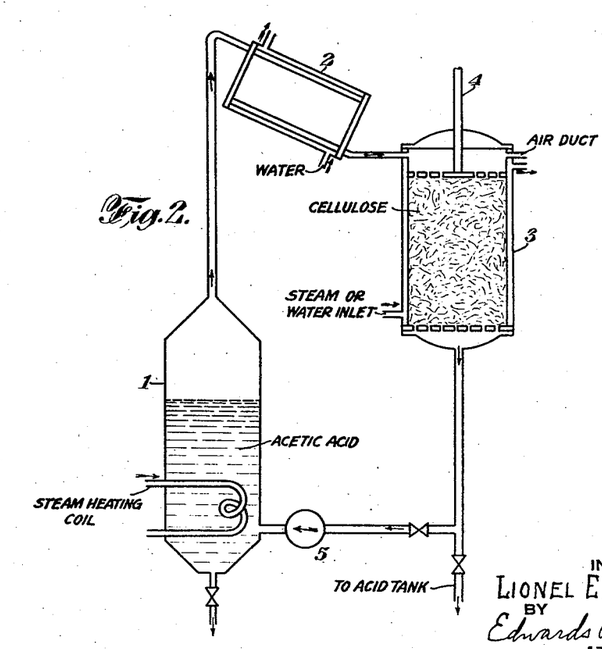
Figure 2 is a diagrammatic layout of apparatus for hot acid treatment of the pulp.

The treatment may be carried out by extracting the cellulose with acetic acid at a temperature of about 90° C. for 30 minutes. Pure acetic acid at 90° C. from the condenser 2 is allowed to flow through the cellulose in the extractor 3 and remove the residual, soluble coloring material and at the same time further reduce the moisture content of the pulp. The effluent is returned to a suitable reservoir of boiling acetic acid 1 by means of gravity flow or a pump 5 and carries the coloring material with it. The extracted impurities thus accumulate in the reservoir 1 and only pure distilled acid is allowed to contact the pulp. Upon the completion of the treatment the cellulose is saturated with acetic acid. By this system of extraction the treating acid may be used repeatedly by adding a sufficient amount of fresh acid to the system to replace the amount retained by the cellulose. Re-use of the treating acid is usually limited only by the increasing amount of water accumulated from the extraction of successive batches of cellulose. After the extraction of any excess acid is pressed from the cellulose by means of a piston 4 until the ratio of acid to cellulose is approximately 3:1.

Where it is convenient to use the mercerized cellulose in a water wet condition, the coloring material may be removed, the cellulose further activated and dehydrated by a modification of the process described in the copending application of Lyle Sheldon et al., S. N. 70,372, filed March 23, 1936. The method comprises displacing the water held by the mercerized cellulose by means of a liquid piston of acetic acid at a temperature of the order of 90° C. After the coloring material and water have been thus removed, the treating acid is displaced by a column of fresh acid at room temperature which leaves the cellulosic pulp thoroughly saturated with pure acetic acid. The effluent containing the coloring material is passed to suitable storage for re-use in treating successive batches of pulp. Upon the completion of the treatment the excess acid is pressed from the pulp until the ratio of acid to pulp is approximately 3:1.

The acetic acid saturated cellulose is now transferred to an acetylator and the temperature of the mass adjusted to the order of 25° C. Three parts of glacial acetic acid containing 0.026 part of concentrated sulfuric acid (sp. gr. 1.835) to each part of oven dry cellulose are then uniformly incorporated into the cellulose by agitation in a period of about 15 minutes or less, during which the temperature is maintained at approximately 25° C. The effect of this treatment is to reduce the cuprammonium viscosity of the cellulose to the order of 6 centipoises without any degrading effect as measured by appreciable lowering of the alpha cellulose content. As soon as all of the mixed acid has been added, 2.31 parts of 95% acetic anhydride (equivalent to 2.2 parts of 100%) are slowly added during continuous agitation. The rate of addition of the anhydride is carefully regulated, so that the temperature of the mass during the addition may be controlled by means of the water jacket with which the acetylator is provided to effect a uniform, nearly straight line increase in the temperature to the order of 42.5° C. After all of the acetic anhydride is added, agitation is continued and the temperature held at the order of 42.5° C. continuously until a clear grain free triacetate is formed. This may usually be accomplished in from 60–80 minutes after the mass has reached the 42.5° C. temperature level. The solution of triacetate thus formed has a color and haze of less than 50 p. p. m. and a combined acetic acid content in excess of 61% and is insoluble in acetone.

To form acetone soluble acetate, the material is hydrolyzed by adding 2.2 parts of 50% acetic acid containing 0.063 part of concentrated sulfuric acid (sp. gr. 1.835) to each part of oven dry cellulose with continued, slow agitation and the mass maintained at a temperature of 42.5° C. The time required for hydrolyzing depends on the final acetyl content desired. For example, for acetone soluble acetate having an acetyl value of 54%, the treatment is continued for approximately 17 hours.

When the cellulose acetate (in acetic acid solution) has acquired the desired combined acetic acid content, 0.2 part of sodium acetate to each part of oven dry cellulose dissolved in a small quantity of 50% acetic acid are slowly added with constant agitation. The acetic acid solution of the acetate is then pumped directly from the hydrolyzing tank through a single stage of filtration, using cotton batting and/or bleached filter cloth as the filter medium. The solution is discharged from the filter press directly into the distribution box of the precipitating tank and precipitated by allowing it to flow into water or dilute acetic acid with constant agitation, controlled in such a manner as to form slender threads of acetate. The precipitated material is then washed until free of acetic acid with cold water and then given a treatment with water at 95° C. for about 45 minutes. The excess water is drained from the acetate and the latter dried by any of the usual methods at a temperature preferably of the order of 75° C.

The yield of acetone soluble acetate is 1.56 parts or more from each part of oven dry cellulose. A typical sample of the acetate has the following analysis:

| | | |
|---|---|---|
| Stability | per cent | 0.069 |
| Combined sulfuric acid | do | 0.11 |
| Charring point | °C | 210 |
| Melting point | °C | 250–270 |
| Ash | per cent | 0.03 |
| Color } in acetone solution<br>Haze } | p. p. m | 100–40 |

The acetone solutions of the acetate possess a highly desirable brilliancy and sparkle which are not found even in the solutions of the best grades of acetates derived from purified linters.

Example B

The invention finds useful application in the production of very satisfactory qualities of acetate of even lower cost by employing a somewhat less highly purified cellulosic pulp. For this purpose the wood base material is treated by the correlated steps described in Example A with the exception that the mercerizing treatment is omitted. The purified cellulosic pulp will have an analysis approximately as follows:

| | |
|---|---|
| Alpha cellulose | 96.6% |
| Soda soubility | 3.1% |
| Cuprammonium viscosity (ctps.) | 34.0 |
| Bleachability | 0.3% |
| Pentosans | 2.8% |
| Ash | 0.35% |

The pulp is extracted with hot acetic acid, pretreated with catalyst and acetylated substantially as described in Example A. The acetate is of satisfactory quality for all purposes where exceptionally low color of the acetone solutions is not essential. The acetate is characterized by its homogeneity and nearly invariable physical and chemical properties between successive batches.

The foregoing examples illustrate the use of cellulose prepared from wood by a special method and which may be dried and thereafter acetylated with novel results. The invention is likewise applicable as above indicated to cellulose prepared from wood by other methods, as illustrated in the following example.

Example C

For the production of cellulose acetate of high quality yielding acetone solutions of less than 200 p. p. m. color and haze, it has been found desirable to use mercerized cellulose preferably having, for example, an analysis approximately as follows:

| | |
|---|---|
| Alpha cellulose, not less than | 98.0% |
| Viscosity (ctps.), not less than | 20.0 |
| Soda solubility, not greater than | 2.5% |
| Ash, not greater than | 0.1% |
| Bleachability, not greater than | 0.3% |
| Pentosans, not greater than | 2.5% |
| Iron, not greater than | 30 p. p. m. |
| Copper, not greater than | 10 p. p. m. |

Material of this character may be prepared by mercerizing the higher qualities of bleached sulfite wood pulp having, for example, the following approximate analysis:

| | Per cent |
|---|---|
| Alpha cellulose | 94.0 |
| Soda solubility | 7.0 |
| Bleachability | 0.4 |

They may also be prepared similarly from so-called alpha pulps having alpha cellulose content of about 94%–97% and a soda solubility of the order of 5%–10%.

The mercerizing treatment may be conveniently carried out by means of a sodium hydroxide solution of the order of 14% concentration, a pulp consistency of the order of 3% for about 30 minutes at from between 25°–30° C. At the end of the treatment the caustic reagent should be removed from the cellulose by a rapid washing with purified water until the pulp is neutral to avoid any deleterious effect on the reactivity or other properties of the cellulose. The wet, mercerized cellulose may then be dried in the customary manner, for instance in an air blower at from 50°–60° C. until the moisture content has been reduced to 2%–4%. Alternately, if desired, the water may be removed by displacement with acetic acid in the following manner: The cellulose is transferred in the form of a water slurry into a tank built of glazed tile or any suitable material which will not be detrimentally affected by acetic acid in any concentration. The tank may be of any convenient size, but should be of such dimensions that the ratio of the length of the charge of cellulose to its diameter shall be about four to one. The excess water of the slurry is made to start draining from the cellulose by means of suction applied at an outlet in the bottom of the tank and as the water level reaches the top surface of the sedimented cellulose, glacial acetic acid is introduced into the dehydration tank until the top surface of the cellulose is covered to a depth of several inches. A vacuum of 5 inches or more of mercury, preferably as high as the equipment will permit, is then applied at the bottom discharge of the tank which has the effect of drawing the overlying acetic acid through the column of cellulose as a liquid piston. The effluent is tested at frequent intervals by any suitable indicator and as soon as the presence of acid is shown, the amount of suction is reduced so that the acetic acid piston is drawn through the cellulose slowly in order to provide time for diffusion between the liquids and permit the acid to be preferentially adsorbed by the cellulose and to displace the water, and particularly the adsorbed water throughout the interstices and capillaries of the cellulose.

Until the appearance of acid at the discharge of the dehydrator, the operation may be carried on as rapidly as the facilities will permit, as during this phase of the process substantially only water is discharged; thus no dilution of acid is involved in this portion of the effluent. The second phase of the process is continued, care being taken to maintain the column of cellulose covered with glacial acetic acid and the effluent is tested until only glacial acetic acid is discharged. At the appearance of undiluted acid, the operation is terminated and the cellulose will contain less than 2% water.

The mercerized, dried cellulose is next treated with hot acetic acid to remove coloring material and to activate it. This treatment may be carried out by extracting the cellulose in suitable extraction apparatus of the well known type with liquid acetic acid distillate at a temperature of 90° C., usually for about 30 minutes. As the liquid distillate flows through the cellulose the soluble coloring material is removed along with residual moisture. The effluent is returned to a suitable reservoir of boiling acetic acid, carrying the coloring material with it. The extracted impurities thus accumulate in the reservoir of boiling acid and only distilled pure acid is allowed to come in contact with the cellulose. Upon the completion of the removal of the coloring material the cellulose becomes saturated with about 3 or more parts of pure acetic acid to each part of cellulose. By this system of extraction the treating acid may be used repeatedly by adding a sufficient amount of fresh acid to the system to replace the amount retained by the extracted cellulose. Its re-use is usually limited only by the increasing amount of water accumulated from the successive extraction of batches of cellulose. After the extraction any excess acid is pressed from the cellulose until the ratio of acid to cellulose is approximately 3:1.

An alternate method of treating the dried cellulose consists in using a type of apparatus illustrated in Figure 2. This apparatus may be conveniently used in the above described process as the extraction receptacle in which the cellulose is held while the liquid distillate is allowed to pass through it at elevated temperature. Upon the completion of the extraction the excess acid may be removed from the cellulose by means of the piston until the ratio of acid to cellulose is of the order of 3:1.

Another convenient means of removing the coloring material and activating the cellulose consists in treating the cellulose with about 7 parts of acetic acid to each part of cellulose for about 90 minutes at a temperature of the order of 70° C. in the apparatus illustrated in Figure 2. Upon the completion of the treatment the cellulose is pressed into a compact cake having a density of the order of 0.6 gram to each cubic centimeter. Seven parts of fresh acetic acid, preferably at 25° C. of lower are then forced through the cake of cellulose as a liquid piston by means of air pressure. In this manner the treating acid containing the soluble coloring material is replaced and the cellulose cake saturated with fresh acetic acid. The excess acetic acid held by the cake of cellulose is then removed by means of the piston until the ratio of acid to cellulose is approximately 3:1. The colored pretreating acid is stored for re-use in treating successive lots of cellulose. Irrespective of the means by which the treatment of the dried cellulose is carried out, a part or all of the residual moisture in the cellulose is removed by diffusion and displacement.

The acetic acid wet cellulose is now transferred to an acetylator and the temperature of the mass adjusted to 25° C. Three parts of glacial acetic acid containing 0.026 part of concentrated sulfuric acid (sp. gr. 1.835) to each part of oven dry cellulose are then uniformly incorporated into the cellulose by agitation in a period of about 15 minutes during which the temperature is maintained at 25° C. (curve AA', Figure 1). As soon as all of the mixed acid (i. e., acetic acid and sulfuric acids) has been added, 2.31 parts of 95% acetic anhydride (or 2.2 parts of 100%) are slowly added during continuous agitation of the mass. The rate of addition of the anhydride is carefully regulated so that the temperature of the mass during the addition may be controlled by means of the water jacket with which the acetylator is provided to effect a uniform increase in the temperature to the order of 42.5° C. (curve A'C) upon the completion of the addition. After all of the acetic anhydride is added, agitation is continued and the temperature held at 42.5° C. continuously until an acetate solution free of grain is formed (curve CD). This may usually be accomplished in about 70–80 minutes after the mass reaches the 42.5° C. temperature level. The solution of triacetate thus formed has a color and haze of less than 100 p. p. m., an acetyl content in excess of 61% and is insoluble in acetone.

If acetone soluble acetate is desired, the material is now hydrolyzed. This is accomplished by adding 2.2 parts of 50% acetic acid containing 0.063 part of concentrated sulfuric acid (sp. gr. 1.835) with continued agitation and the mass maintained at a temperature of 42.5° C. The time required for hydrolysis depends on the final acetyl content desired. For example, for acetone soluble acetate having a combined acetic acid content of 54%, the solution is held at 42.5° C. for about 17 hours.

When the cellulose acetate (in acetic acid solution) has acquired the desired combined acetic acid content, 0.2 part of sodium acetate dissolved in a small quantity of 50% acetic acid are slowly added with constant agitation. The acetic acid solution of the acetate is then pumped directly from the hydrolyzing tank through a single stage of filtration, using cotton batting and/or bleached filter cloth as the filter medium. The solution is discharged from the filter press directly into a distribution box of the precipitating tank. The acetate is precipitated by allowing the solution to flow into water or dilute acetic acid with constant agitation, controlled in such a manner as to form slender threads of acetate. The precipitated acetate is then washed until free of acetic acid with cold water and finally given a treatment with water at 95° C. for about 45 minutes. The excess water is drained from the acetate and the latter subsequently dried by the usual methods at a temperature of about 75° C.

The cellulose acetate obtained as the result of the process described in the foregoing example will yield acetone solutions having less than 200 p. p. m. color and haze and is eminently suitable for use in photographic film, colorless lacquers, sheeting and plastics.

The foregoing examples serve to point out in a detailed manner certain embodiments of the invention which result in a cellulose acetate product from wood base raw material of low cost and distinguished by properties and characteristics invariable between successive batches, equal or superior to acetate derived from the highest available qualities of cotton linters. As many changes could be made in the processes set forth and the materials employed therein without departing from the scope of the invention, it is intended that the specific disclosures shall be interpreted as illustrative and not in a limiting sense except as indicated by the claims.

A treatment of wood cellulose with hot acetic acid is also disclosed in a copending application Serial No. 81,844 in which applicant is co-inventor. In this prior application the claims do not specifically describe the acetic acid treatment including the displacing of the acetic acid with fresh acid as in the present case.

Since no published methods have been found which clearly define certain measurements used herein, the following definitions of such treatments are given.

Soda soluble material is defined as that portion of a cellulosic sample dissolved when it is subjected to the action of 7.14% sodium hydroxide solution at the boiling point of water for 3 hours by a refinement of the method of Griffin, "Technical Methods of Analysis", 492 (1927 ed.), described in copending application of Lyle Sheldon et al., S. N. 81,844, filed May 26, 1936, pages 13–14.

Alpha cellulose is defined as that portion of a sample of cellulosic material not dissolved by 17.5% sodium hydroxide solution at 20° C., determined by a refinement of the method described by H. F. Lewis in "Technical Association Papers", Series XVII, #1, 436 (1934), described in copending application of Lyle Sheldon et al., S. N. 81,844, filed May 26, 1936, pages 11–13.

Bleachability of cellulose, as used herein, is a measure of the materials oxidizable by potassium permanganate in the presence of an acid under specific conditions, and is expressed in terms of standard bleaching powder containing 35% available chlorine. A detailed description of the method, including the conversion table for expressing the permanganate number in terms of percent bleaching powder of 35% available chlorine, was published by T. A. P. P. I., Series XVII, #1, 146 (1934), "Permanganate Number of Pulp" by R. N. Wiles.

Cuprammonium viscosity, as used herein, means the viscosity number or value obtained according to the following method: The cuprammonium solution was prepared by the action of air on electrolytic copper in the presence of strong ammonia water. The copper concentration of the solutions employed for viscosity determinations was 30, ± 2 g. per liter and the ammonia content was 165 g., ± 2 g. per liter. The concentration of cellulose employed was 0.6 g. (oven dry basis) per 100 cc. of cuprammonium solution. The cellulose sample for this determination was dried at 70° C. to 4% moisture content. After weighing out 0.6 g. (oven dry basis), the sample was moistened, squeezed to a uniform weight of 2 g. and then dispersed in cuprammonium solution in an atmosphere of hydrogen from which oxygen has been completely removed. The viscosity measurements were made at 25° C. with a modified Ostwald pipet, constructed according to the specifications of the American Chemical Society Committee on the Viscosity of Cellulose (Journal of Industrial & Engineering Chemistry, I, #49; 1929). The time of flow in seconds was converted to centipoises on the basis of the calbration of the pipet with oils of known viscosity in centipoises obtained from the United States Bureau of Standards.

*Color and haze.*—The measurements referred to herein of the color and haze of the acetic acid and acetone solutions of the acetate were made by comparisons with standards of known color and turbidity expressed in parts per million. The standards are those used for water analysis recommended by the American Public Health Association and consist of platinum cobalt (for color determinations) and fuller's earth (for turbidity comparisons). With the materials recommended by the American Public Health Association, a series of standard solutions ranging from 10 p. p. m. to 200 p. p. m. inclusive at intervals of 10 p. p. m. were prepared for both color and haze. 100 cc. of each of these solutions was hermetically sealed in an 8-ounce, wide-mouth, glass-stoppered bottle having an internal diameter of $2\frac{7}{16}$ inches. The acetate dope samples to be measured were prepared in bottles identical with those employed in making the color and haze standards and compared under a controlled source of light, first with the color standards until the particular solution of each which most nearly corresponded to the dope under comparison was found, and then with the haze standards in conjunction with the most appropriate color standard. The measurements of the color and turbidity of the acetate dope are made exactly 1 hour after the dope has been killed by the addition of the dilute acetic acid. At the time of measurement, the dope must be absolutely free from air bubbles and at a temperature of 25° C., and the quantity of dope under comparison in the bottle must not be less than 100 cc. It has been found that color and haze ratings by this method can be made to an accuracy of approximately 10 p. p. m. The ratio of acetone to cellulose acetate in the acetone solutions upon which color and haze measurements were made was 5.4 to one.

I claim:

1. In the process of producing cellulose acetate from wood, the sequence of purification steps which comprise treating said wood with a sulfite delignifying solution to produce pulp, washing the pulp with water at elevated temperature, defibering and screening said pulp to remove neps and fiber bundles and to provide a maximum exposed surface of ligneous material, chlorinating said pulp with an amount of chlorine expressed in pounds equal to 16%–18% of its bleach value, removing the chlorinated compounds by treatment with a dilute solution of sodium hydroxide at a temperature in excess of 60° C., bleaching the chlorinated pulp with a hypochlorite solution of from 1%–6% concentration, with a pH above 8, at a temperature between 25°–35° C., treating the bleached pulp in a nonmercerizing solution of sodium hydroxide at a temperature in excess of 60° C., repeating the bleaching treatment with hypochlorite, mercerizing the bleached pulp in a 12%–15% solution of sodium hydroxide at a temperature between 25°–35° C., washing the mercerized pulp in less than thirty minutes with water until neutral, treating the mercerized pulp with acetic acid at a temperature in the range from 50° C. to boiling, displacing the treating acid with glacial acetic acid, thereafter treating said cellulose with acetic anhydride in the presence of a sulfuric acid catalyst.

2. In the process of producing cellulose acetate from wood cellulosic material, the sequence of steps which comprises supplying wood chips having a moisture content in excess of 30%, boiling said chips in water until all of the air has been removed, steaming said chips to reduce their water content and fill the interstices and capillaries with steam, condensing the steam within the chips and impregnating them by introducing a sulfite treating solution at a temperature less than 100° C., subjecting the impregnated chips to a mild digestion at a temperature not exceeding the order of 140° C. until a readily defiberable pulp is obtained, washing the pulp at elevated temperature until free of treating solution, defibering and screening the washed pulp until free of neps and fiber bundles, chlorinating said pulp by adding an amount of chlorine expressed in pounds equal to 16%–18% of the bleach value of the pulp, removing the chlorinated compounds and reducing the bleach value of said pulp to the order of 1.5% by treating in a sodium hydroxide solution of the order of 1% concentration at boiling temperature and washing the pulp until neutral, bleaching said pulp in a 1%–6% concentration of hypochlorite at 25°–35° C. to remove oxidizable material and to control the cuprammonium viscosity, the pH of the solution being controlled to above 8 by the addition of alkali to avoid degradation, washing the pulp until neutral, treating the bleached pulp in a boiling solution of sodium hydroxide of a concentration between 5%–9% to increase the alpha cellulose content and to reduce the soda solubility, repeating the hypochlorite bleach to further reduce oxidizable impurities, mercerizing the bleached pulp at 25°–35° C. in a sodium hydroxide solution of the order of 12%–15% concentration to increase the swelling, permeability and reactivity of said pulp, to further increase the alpha cellulose content to above 97% and reduce the soda solubility below 4%, washing the mercerized cellulose with water until its pH is approximately 8 in less than thirty minutes to maintain its permeability and reactivity, extracting said mercerized cellulose with acetic acid at a temperature within the range of 50°–100° C. to remove residual coloring impurities and reduce its moisture content below 4%.

3. In the process of producing cellulose acetate yielding solutions of less than 100 p. p. m. color and haze, the steps which comprise supplying dried sulfite pulp having an alpha cellulose content of not less than the order of 98%, a soda solubility of not more than the order of 4% and a bleachability of not more than the order of 0.5%, removing the coloring material and activating said pulp by extracting with acetic acid at a temperature in the range from 50° C. to boiling, thereafter treating with sulfuric acid catalyst at the order of 25° C. for less than thirty minutes and adding acetic anhydride to form cellulose acetate.

4. In the process of producing cellulose acetate from unmercerized sulfite wood pulp, the steps which comprise supplying bleached wood pulp having an alpha cellulose content not less than 96%, a soda solubility not greater than 4% and a bleach value not exceeding 1.5%, treating said pulp with acetic acid at a temperature in the range of 50°–100° C., replacing the treating acid and saturating said pulp with fresh acetic acid, uniformly incorporating a sulfuric acid catalyst therein in less than thirty minutes and thereafter treating with not more than 2.2 parts of acetic anhydride to each part of oven dry pulp at a temperature not exceeding 45° C. until said pulp is converted into grain free triacetate.

5. In the process of preparing cellulose acetate from wood pulp, the system of extracting cellulose with acetic acid which comprises forming the cellulose into a cake of uniform density, passing hot acetic acid condensate through the cake until the extractable material is removed, returning the acetic acid effluent containing the extractable material to a distilling vessel and distilling acetic acid from said effluent for use in extracting a fresh cake of cellulose whereby the extractable impurities are accumulated in the distilling vessel.

6. In the process of preparing cellulose acetate from dried wood pulp, the steps which comprise treating said pulp with acetic acid at a temperature in the range from 50° C. to boiling, cooling the mass to the order of 25° C. and treating said mass with a sulfuric acid catalyst for less than thirty minutes prior to the addition of acetic anhydride.

7. The process of producing cellulose acetate from wood comprising providing a purified sulfite pulp, repeatedly leaching said pulp with acetic acid in a temperature range of 50° to 100° C. so as to displace the treating acid with fresh acid a sufficient number of times completely to remove the coloring matter in said pulp, incorporating sulphuric acid catalyst into said pulp while saturated with the acetic acid remaining in the pulp from the final leach, and thoroughly mixing said catalyst into the pulp at a temperature of the order of 25° C., adding not more than 2.2 parts of acetic anhydride to each part of oven dry cellulose and completing the acetylation at a temperature not exceeding 45° C. until the grain free triacetate is formed.

LIONEL ELMER GOFF.